US010439880B2

(12) United States Patent
Bryant et al.

(10) Patent No.: US 10,439,880 B2
(45) Date of Patent: Oct. 8, 2019

(54) LOOP-FREE CONVERGENCE IN COMMUNICATION NETWORKS

(71) Applicant: CISCO TECHNOLOGY, INC., San Jose, CA (US)

(72) Inventors: Stewart Frederick Bryant, Surrey (GB); Giles Douglas Yorke Heron, Hampstead (GB); Christian Cassar, Hampton (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 1105 days.

(21) Appl. No.: 14/533,975

(22) Filed: Nov. 5, 2014

(65) Prior Publication Data

US 2016/0127192 A1    May 5, 2016

(51) Int. Cl.
| | | |
|---|---|---|
| G06F 15/173 | (2006.01) | |
| H04L 12/24 | (2006.01) | |
| H04L 12/26 | (2006.01) | |
| H04L 12/42 | (2006.01) | |
| H04L 12/755 | (2013.01) | |
| H04L 12/751 | (2013.01) | |
| H04L 12/721 | (2013.01) | |

(Continued)

(52) U.S. Cl.
CPC .............. *H04L 41/12* (2013.01); *H04L 12/42* (2013.01); *H04L 43/50* (2013.01); *H04L 45/021* (2013.01); *H04L 45/026* (2013.01); *H04L 45/123* (2013.01); *H04L 45/18* (2013.01); *H04L 45/28* (2013.01)

(58) Field of Classification Search
CPC ......... H04L 41/12; H04L 12/42; H04L 43/50; H04L 45/021; H04L 45/026; H04L 45/123; H04L 45/18; H04L 45/28; H04L 43/10; H04L 67/42; H04L 43/0864; H04L 43/12; H04L 45/22; H04L 43/0811; H04L 43/0852; H04L 43/08; H04L 45/24; H04L 65/4076; H04L 45/02; H04L 45/26; H04L 45/64; H04L 45/54; H04L 47/10; H04L 45/00; H04L 47/2441; H04L 69/163; H04W 4/02
USPC ........................................................ 709/224
See application file for complete search history.

(56) References Cited

U.S. PATENT DOCUMENTS 7,330,440 B1    2/2008  Bryant
7,852,772 B2   12/2010  Filsfils et al.
(Continued)

OTHER PUBLICATIONS

Pierre Francois and Olivier Bonaventure (Avoiding transient loops during IGP convergence in IP networks, 2005 IEEE, pp. 237, 242-243).*

(Continued)

*Primary Examiner* — William G Trost, IV
*Assistant Examiner* — Tan Doan
(74) *Attorney, Agent, or Firm* — Cindy Kaplan

(57) ABSTRACT

In one embodiment, a method includes identifying a change in network topology at a network device, transmitting a test packet from the network device to determine if an adjacent network device located in a backup path has converged following the network topology change, and updating a forwarding information base at the network device in response to the network topology change if a response to the test packet indicates that the adjacent network device has converged. An apparatus and logic are also disclosed herein.

20 Claims, 4 Drawing Sheets

(51) Int. Cl.
*H04L 12/705* (2013.01)
*H04L 12/703* (2013.01)

(56) References Cited

U.S. PATENT DOCUMENTS

| | | | | |
|---|---|---|---|---|
| 8,139,492 | B1* | 3/2012 | Peterson | H04L 45/00 370/238 |
| 9,876,705 | B1* | 1/2018 | Poutievski | H04L 45/02 |
| 2003/0016624 | A1* | 1/2003 | Bare | H04L 29/12009 370/217 |
| 2003/0067867 | A1* | 4/2003 | Weis | H04L 41/0663 370/210 |
| 2004/0258002 | A1* | 12/2004 | Tran | H04L 45/026 370/254 |
| 2008/0080507 | A1* | 4/2008 | Swallow | H04L 43/50 370/392 |
| 2011/0122762 | A1* | 5/2011 | Wu | H04L 12/437 370/218 |
| 2012/0147742 | A1* | 6/2012 | Kitamori | H04L 43/50 370/225 |

OTHER PUBLICATIONS

IETF RFC 5714, M. Shand et al., "IP Fast Reroute Framework", Jan. 2010.
IETF RFC 5715, M. Shand et al., "A Framework for Loop-Free Convergence", Jan. 2010.
IETF RFC 6976, M. Shand et al., "Framework for Loop-Free Convergence Using the Ordered Forwarding Information Base (oFIB) Approach", Jul. 2013.

* cited by examiner

LOOP-FREE CONVERGENCE IN COMMUNICATION NETWORKS

TECHNICAL FIELD

The present disclosure relates generally to communication networks, and more particularly, to loop-free convergence in communication networks.

BACKGROUND

Meeting the demands of businesses and consumers generally requires that bandwidth and latency guarantees continue to be met when failures occur. Protection mechanisms become necessary to ensure that services are restored within a sufficiently short time so that the user experience is not affected. To address this requirement, various "Fast Reroute" techniques have been developed that provide rapid reaction to a failure such that the user experience is preserved. In a network employing Fast Reroute, traffic flowing through a failed link or node is rerouted through one or more preconfigured backup tunnels or alternate paths. The presence of loops due to transient inconsistencies in the forwarding information bases during network convergence may result in packet loss and impact the user experience.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
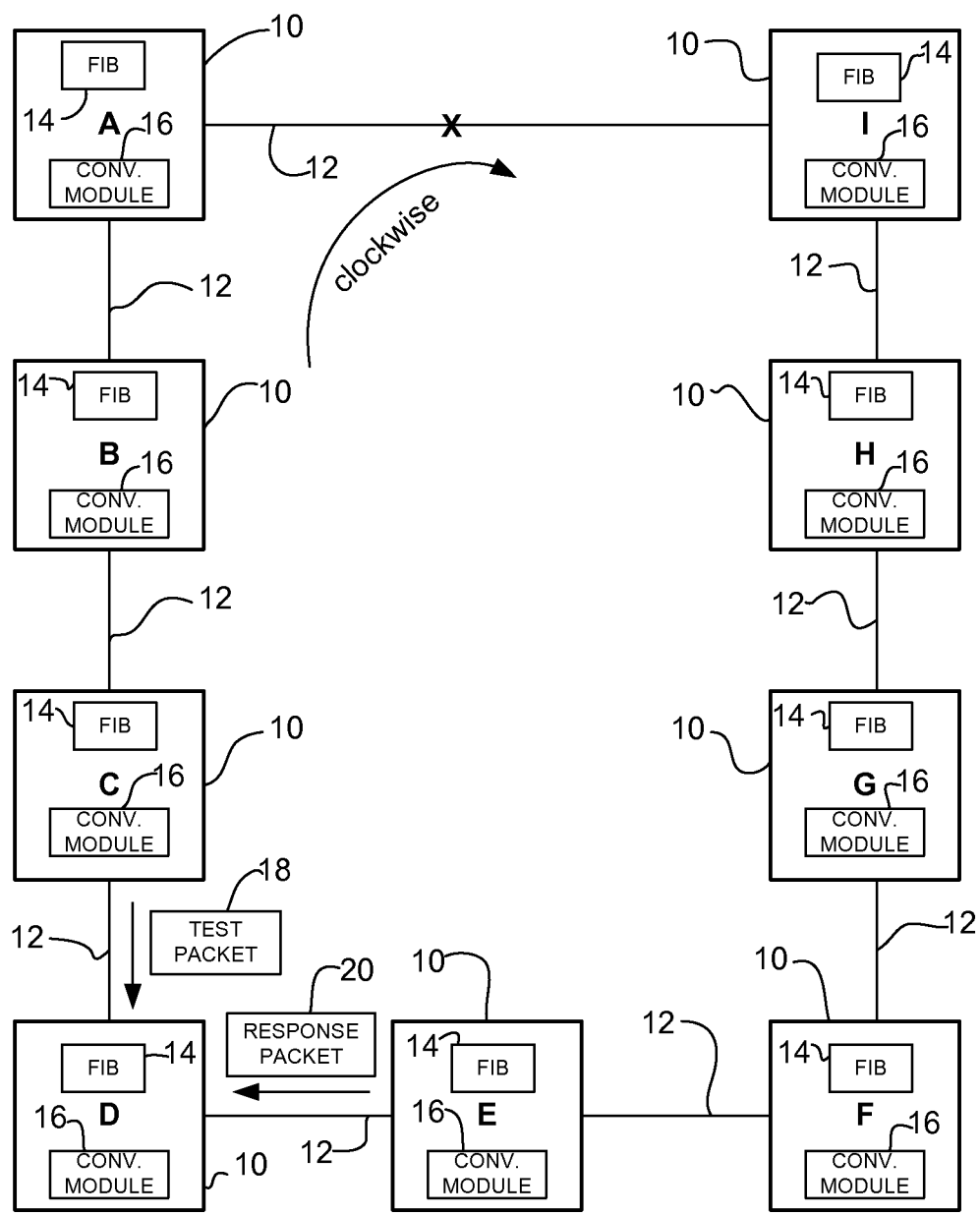
FIG. 1 illustrates an example of a network in which embodiments described herein may be implemented.

In one embodiment, a method generally comprises identifying a change in network topology at a network device, transmitting a test packet from the network device to determine if an adjacent network device located in a backup path has converged following the network topology change, and updating a forwarding information base at the network device in response to the network topology change if a response to the test packet indicates that the adjacent network device has converged.

In another embodiment, an apparatus generally comprises a forwarding information base and a processor for identifying a change in network topology, transmitting a test packet to determine if an adjacent network device located in a backup path has converged following the network topology change, and updating the forwarding information base in response to the network topology change if a response to the test packet indicates that the adjacent network device has converged.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

IP (Internet Protocol) Fast Reroute mechanisms provide protection against link or node failure by invoking locally determined repair paths. One example of Fast Reroute (FRR) is described in IETF (Internet Engineering Task Force) RFC (Request for Comments) 5714, "IP Fast Reroute Framework", M. Shand et al., January 2010. In order to prevent packet loss during convergence, it is important to avoid micro-loops. A micro-loop is a packet forwarding loop that may occur transiently among two or more network devices (e.g., routers) in a hop-by-hop packet forwarding paradigm. Ensuring the absence of micro-loops is important not only because they can cause packet loss in traffic that is affected by a failure, but because by saturating a link with looping packets, micro-loops may cause congestion. This congestion may result in routers discarding traffic that would otherwise be unaffected by the failure.

Each time that a network topology changes, some routers may need to modify their forwarding information bases (FIBs) to take into account the new topology. The topology change causes a convergence phase, during which routers may transiently have inconsistent FIBs. This may lead to packet loops and losses, even if the reachability of the destination is not compromised after the topology change.

The embodiments described herein provide a control plane approach for preventing micro-loops in a ring topology. In certain embodiments, a network device may test if it is safe to update its FIB by transmitting a test packet to a new next hop to determine whether or not the packet is looped back to the network device. If the packet is not looped back to the network device, nodes in the backup (alternate) data path have already converged and it is safe for the network device to update its FIB to transmit traffic on the backup path.

Figure 2:
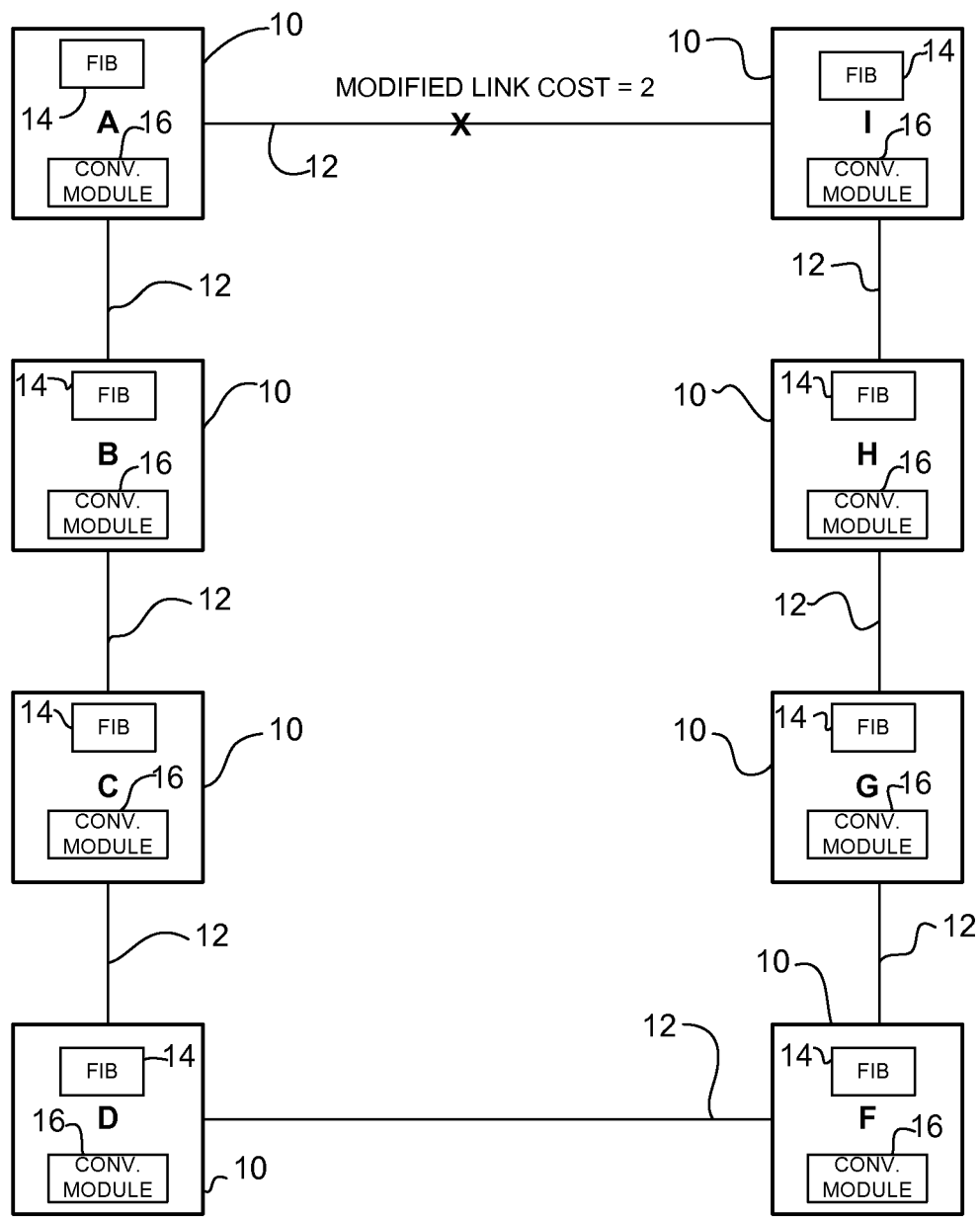
FIG. 2 illustrates another example of a network in which embodiments described herein may be implemented.

Referring now to the drawings, and first to FIGS. 1 and 2, examples of networks in which embodiments described herein may be implemented are shown. The embodiments operate in the context of a data communications network including multiple network devices (nodes). For simplification, only a limited number of network devices are shown herein. In the examples shown in FIGS. 1 and 2, a plurality of network devices 10 are in communication via network links 12 in a ring topology. The example shown in FIG. 1 comprises an odd number of nodes (A, B, C, D, E, F, G, H, I) connected to form a ring. The ring shown in FIG. 2 comprises an even number of nodes (A, B, C, D, F, G, H, I). It is to be understood that the ring may include any number of nodes (odd or even). One or more of the nodes 10 may be connected to one or more other networks. For example, node A and node I may be connected to a backbone (not shown). The nodes 10 may be in their own area or otherwise know that they are in the ring.

The network devices 10 may be routers, switches, or other network devices configured to perform forwarding functions (e.g., L2, L3, or L2/L3 devices). Each of the network devices 10 may include one or more FIBs (forwarding tables) 14. The FIB 14 may contain addresses and forwarding information (routes) for the addresses. For example, the FIB 14 may maintain next hop address information based on the information in an IP routing table.

Each node 10 may advertise links 12 to neighboring nodes and provide a cost associated with each link, which can be based on any appropriate metric such as link bandwidth or delay. Based on the advertised information in the form of a link state packet (LSP), for example, each node may construct a link state database, which is a map of the network topology, and from that construct an optimum route to each available node based on an appropriate algorithm such as a shortest path first (SPF) algorithm, for example. The results of the SPF are stored in a routing information base (RIB) (not shown) and based on these results, the FIB 14 is updated to control forwarding of packets appropriately. When there is a change in network topology, an LSP representing the change may be flooded through the network by each node 10 adjacent to the change, with each node receiving the LSP sending it to each adjacent node.

The links 12 may all have the same cost (e.g., a normal policy). The cost of one of the links 12 may be modified to prevent a false indication that it is safe for a network device to update its FIB. For example, if there is an even number of nodes, as shown in FIG. 2, the cost of one of the links may be increased so that a test packet is always sent in the same direction in the ring, as described in detail below.

One or more of the nodes 10 may include a convergence test module (conv. module) 16. The convergence module 16 may be used to test whether it is safe to update the node's FIB by sending a test packet 18 and observing if the packet is micro-looped back to the node, as described further below. In one embodiment, the test packet 18 is an ICMP (Internet Control Message Protocol) echo request. If the node 10 receives an echo response packet 20 from another node, it is safe to update its FIB. It is to be understood that an ICMP echo message is only an example and that other protocols may be used to transmit a test packet.

It is to be understood that the networks shown in FIGS. 1 and 2 and described above are only examples and that the embodiments described herein may be implemented in networks having different network devices, without departing from the scope of the embodiments. For example, the embodiments described herein may be used in SDN (Software Defined Networking).

Figure 3:
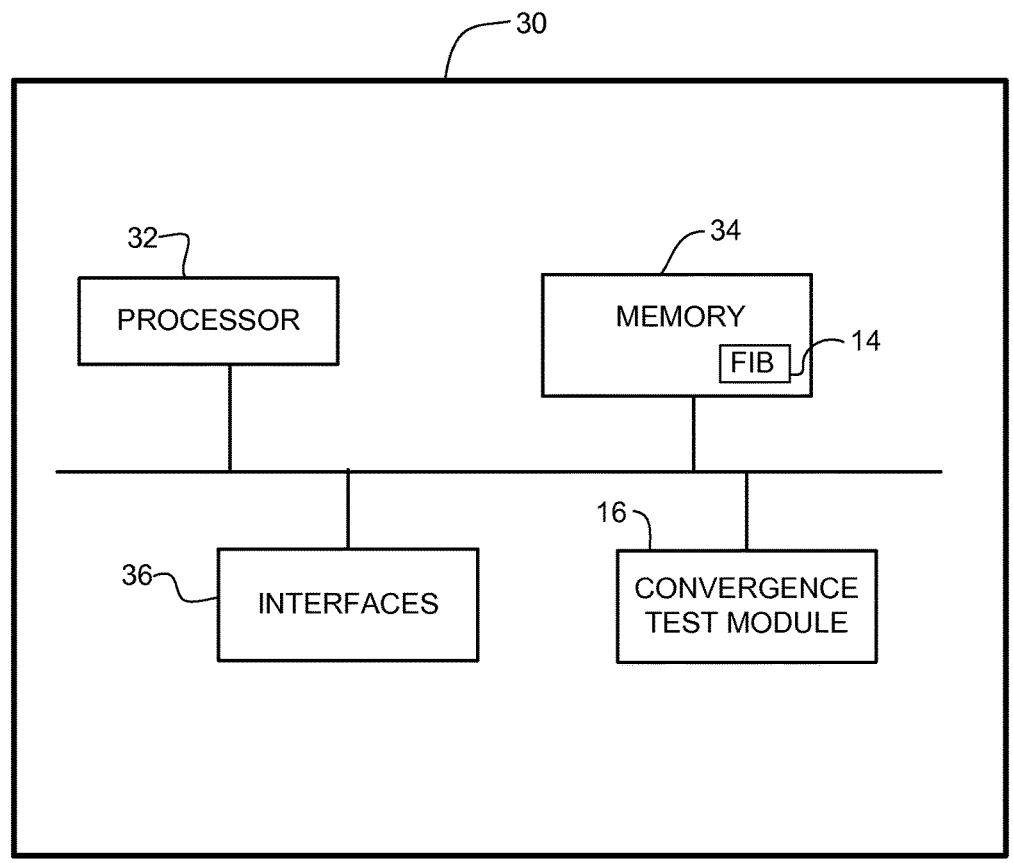
FIG. 3 depicts an example of a network device useful in implementing embodiments described herein.

FIG. 3 illustrates an example of a network device 30 (e.g., node 10 in FIGS. 1 and 2) that may be used to implement the embodiments described herein. In one embodiment, the network device is a programmable machine that may be implemented in hardware, software, or any combination thereof. The network device 30 includes one or more processor 32, memory 34, network interfaces 36, and convergence test module 16.

Memory 34 may be a volatile memory or non-volatile storage, which stores various applications, operating systems, modules, and data for execution and use by the processor 32. Memory 34 may include one or more forwarding tables (e.g., FIB 14). One or more components of convergence test module 16 (e.g., code, logic, software, etc.) may also be stored in memory 34. The device 30 may include any number of memory components.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 30 may include any number of processors 32.

The network interfaces 36 may comprise any number of interfaces (linecards, ports) for receiving data or transmitting data to other devices. The network interface may include, for example, an Ethernet interface for connection to a computer or network.

It is to be understood that the network device 30 shown in FIG. 3 and described above is only an example and that different configurations of network devices may be used. For example, the network device 30 may further include any suitable combination of hardware, software, algorithms, processors, devices, components, or elements operable to facilitate the capabilities described herein.

Referring again to FIG. 1, the following describes an example of loop-free convergence following a failure of link A-I. In this example, the ring includes an odd number of nodes 10 (A, B, C, D, E, F, G, H, I) and the links 12 all have the same cost. Prior to failure of the link A-I, node D normally sends a packet destined to node I through nodes C, B, and A (four hops in clockwise direction). This path is shorter than the counterclockwise path to node I through nodes E, F, G, and H, which is five hops. Nodes E, F, G, and H send traffic in the counterclockwise direction to node I, since this is the shorter path. (Node E is four hops to node I, node F is three hops, etc. in the counterclockwise direction). When link A-I fails, nodes D, C, B, and A sending traffic destined for node I and beyond need to converge in the order D, C, B, A to prevent micro-loops. For example, if node C converges before node D converges, traffic sent from node C and destined for node I, will be returned to node C from node D. This is because node C is sending traffic in the counterclockwise direction after convergence and node D is still sending traffic in the clockwise direction. In this example, nodes E, F, G, H, and I do not need to make any FIB changes for traffic that will flow counterclockwise after nodes D, C, B, and A have converged.

In one embodiment, nodes D, C, B, and A may test to see if it is safe to update their FIB (i.e., converge) by transmitting a test packet. For example, node C may send test packet (e.g., ICMP echo request) 18 towards node I with TTL (Time-to-Live)=2 over the interface that node C will use post convergence (e.g., towards adjacent node on backup path to node I). The TTL may be implemented, for example, as a counter embedded in the packet 18. If node C traps its own echo request or receives a TTL expired triggered by the echo request back from itself, it is unsafe to update its FIB 14. Node C may resend the test packet 18 after a sufficient wait time to see if node D has yet converged. If node C receives a response packet 20 from another node (e.g., node E in FIG. 1), it is safe for node C to update its FIB. If node C does not receive anything back in response to transmitting the test packet 18, the packet may have been lost and node C may resend the test packet.

Before any FIB updates have taken place, node D will receive a response to its test packet from node F, but nodes C, B, and A will get their test packets back. Thus, node D knows that it is safe to update its FIB, and nodes A and C know that they have to wait and try again later. The time to wait may be a specified or preconfigured interval based on network parameters, for example. When node D has converged, node C will discover that it is safe to converge after sending the test packet 18 and receiving response packet 20.

It is possible that due to the order of prefix update in the FIB, it may appear to a router that it is safe to update its FIB before its next hop is ready. For example, if node D updates its FIB entry for node I before it updates its FIB entry for a prefix P reachable through node I, then when node C tests to see if it is safe for the node to converge, it will find that it is safe to do so even though it is unsafe to converge for traffic to prefix P. This may be addressed by making the FIB entry for node I the last entry to be updated or by waiting additional time (e.g., signaled or configured time) before updating the node's FIB.

In the above example, traffic was originally flowing clockwise to node I (from nodes D, C, B, and A) and needed to be changed to flow counterclockwise to node I. Similar considerations apply to traffic originally flowing counterclockwise to node A that needs to be changed to flow clockwise to node A. Re-convergence of these two sets of traffic can occur independently. Thus, by symmetry it can be seen that in FIG. 1, nodes D and F can update their FIBs concurrently. Similarly node sets C and G, B and H, and A and I can update their FIBs concurrently.

Referring now to FIG. 2, the ring shown contains an even number of nodes (A, B, C, D, F, G, H, I). In this example, node D may use ECMP (Equal Cost Multi-Path) to transmit traffic to node I via nodes C and F, since there are four hops in both directions, with each link having the same cost. Thus, when node C sends a test packet to node D to determine whether it is safe to converge, it may receive a response packet (depending on the ECMP behavior) and falsely assume that it is safe to converge. For example, node D may have not yet converged, but since it can send packets in both directions under normal conditions (using ECMP), it may appear that node D has converged. In order to avoid this false indication of convergence, one of the links 12 in the ring may be modified to have a cost greater than the nominal link cost. In the example shown in FIG. 2, each link is normally assigned a cost equal to 1, but link A-I is modified to have a cost equal to 2. In this case, the distance from node D to node I through nodes C, B, and A is 5, while the distance to node I through nodes F, G, and H is 4. This eliminates the ECMP case in which node D may send packets in either direction.

In one example, the cost of the link may be set greater than the nominal link cost but less than three times the nominal link cost, or greater than n−2 times the nominal link cost, where n is the number of nodes in the ring.

As shown in the above examples, when any link fails in the absence of ECMP, which is automatically avoided in a ring with an odd number of nodes (FIG. 1), and can be avoided by modifying the cost of at least one link in a ring with an even number of nodes (FIG. 2), transmission of a test packet with TTL=2 may be used to cause convergence of the nodes in the desired order.

In another embodiment, the link cost is not modified for rings with an even number of nodes. Instead, when switching a packet, a next hop is picked from a feasible set using a load balancing algorithm that masked out (or de-prioritized) next hops through the input interface. This may be used for example, on software switched platforms.

When link A-I returns to service, the nodes need to converge in the order A, B, C, D (FIG. 1) and A, B, C (FIG. 2) for traffic transmitted towards node I. This can be achieved as follows. If it is the link 12 connected to the node that has returned to service (e.g., node A in the example shown in FIGS. 1 and 2), then the FIB may be updated immediately. Otherwise, a test packet is sent with TTL=2 in the new direction and the process proceeds as described above for a failed link.

Figure 4:
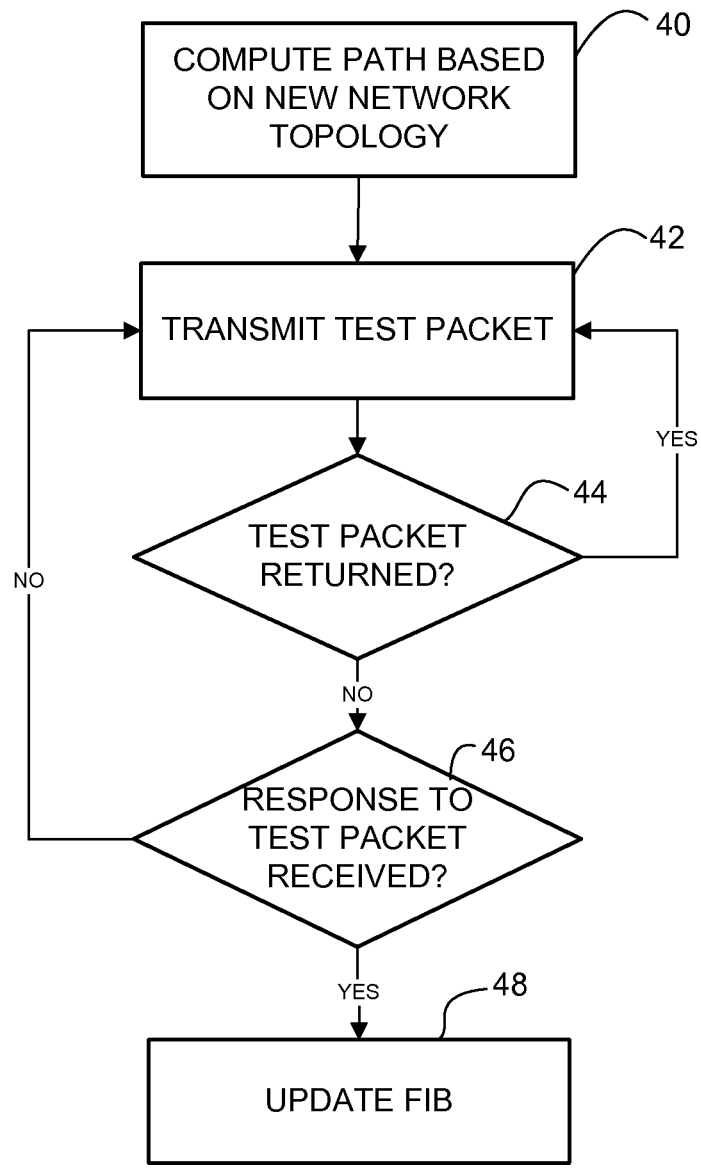
FIG. 4 is a flowchart illustrating a process for loop-free convergence, in accordance with one embodiment.

FIG. 4 is a flowchart illustrating an overview of a process for loop-free convergence, in accordance with one embodiment. The process shown in FIG. 4 and described below may be performed following a change in network topology (e.g., link failure, link return, cost increase, or cost reduction). If a link 12 returns or a link cost is reduced and the network device 10 is adjacent to the recovered (or cost reduced) link, the network device may update its FIB without performing a convergence check. If the network device 10 is not adjacent to a recovered link 12, the network device computes a path based on new network topology information received at the network device (step 40). For example, the network device 10 may identify a backup (alternate) path (e.g., using SPF or other suitable routing protocol) using new link state information received at the network device. The network device 10 transmits a test packet 18 to determine if an adjacent network device located in the backup path has converged following the network topology change (step 42). The test packet may be addressed to the far side of the failure (e.g., node I using backup path in FIG. 1). The network device 10 may, for example, force an ICMP echo request with TTL=2 to the new next hop. If the network device 10 receives its own test packet or the test packet with the TTL expired, the next hop has not yet converged. The network device 10 may send another test packet 18 after a specified wait (steps 44 and 42). If no reply is received after a specified period of time, another test packet 18 may be transmitted (steps 46 and 42). If the network device 10 receives a response 20 to its test packet 18, it is safe to send traffic to the new next hop and network device 10 can update its FIB (step 48). If the network device 10 is adjacent to the failure, it may withdraw the FRR repair.

It is to be understood that the process shown in FIG. 4 and described above is only an example and that steps may be added or modified without departing from the scope of the embodiments. For example, as described above, one of the link costs may be modified if there is an even number of nodes in a ring.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising: identifying a change in network topology at a network device;

transmitting a test packet from the network device to determine if an adjacent network device located in a backup path has converged following said network topology change, wherein the test packet is sent to a node in the backup path downstream of the adjacent network device;

receiving the test packet and determining if the adjacent network device located in the backup path has converged;

determining that the adjacent network device located in the backup path has not yet converged and resending the test packet on the backup path after a specified time to check if the adjacent network device has converged; and receiving a response to the test packet on the backup path indicating the adjacent network device has converged and updating a forwarding information base at the network device in response to said network topology change, wherein the response indicates that nodes in the backup path have converged and it is safe to update the forwarding information base at the network device to transmit traffic on the backup path, wherein the nodes in the backup path have converged when the nodes have consistent forwarding information bases to prevent micro-loops;

wherein the adjacent network device has converged when its forwarding information base has been updated to account for the change in network topology.

2. The method of claim 1 wherein the network device is located in a ring and traffic at the network device needs to be transmitted in a different direction based on said network topology change.

3. The method of claim 1 wherein the test packet comprises an ICMP (Internet Control Message Protocol) echo request.

4. The method of claim 1 wherein the test packet comprises a time-to-live of at least two.

5. The method of claim 1 wherein the network device is located in a ring comprising an even number of nodes and further comprising modifying a cost of at least one link in the ring.

6. The method of claim 5 wherein the modified link cost is greater than a nominal link cost but less than three times the nominal link cost.

7. The method of claim 1 further comprising waiting a specified time before updating the forwarding information base.

8. The method of claim 1 wherein updating the forwarding information base comprises updating an entry for a node adjacent to a failed link after updating other entries for said network topology change.

9. The method of claim 1 wherein the network device is located in a ring comprising an even number of nodes and further comprising selecting a next hop for the test packet using a load balancing algorithm that masks or deprioritizes selected next hops through an input interface.

10. The method of claim 1 further comprising receiving the transmitted test packet at the network device and transmitting another test packet after a specified period of time.

11. The method of claim 1 further comprising transmitting another test packet if no packet is received in response to transmitting the test packet after a specified period of time.

12. An apparatus comprising:
a forwarding information base; and
a processor for identifying a change in network topology, transmitting a test packet to determine if an adjacent network device located in a backup path has converged following said network topology change, processing the received test packet to determine if the adjacent network device located in the backup path has converged, determining that the backup path has not yet converged, resending the test packet on the backup path after a specified time to check if the adjacent network device has converged, and processing a received response to the test packet indicating the adjacent network device has converged and updating the forwarding information base in response to said network topology change;
wherein the adjacent network device has converged when its forwarding information base has been updated to account for the change in network topology; and wherein the response indicates that nodes in the backup path have converged and it is safe to update the forwarding information base at the network device to transmit traffic on the backup path, wherein the nodes in the backup path have converged when the nodes have consistent forwarding information bases to prevent micro-loops.

13. The apparatus of claim 12 configured for placement in a ring in which traffic at the apparatus needs to be transmitted in a different direction based on said network topology change.

14. The apparatus of claim 12 wherein the test packet comprises an ICMP (Internet Control Message Protocol) echo request.

15. The apparatus of claim 12 wherein the test packet comprises a time-to-live of at least two.

16. The apparatus of claim 12 configured for placement in a ring comprising an even number of nodes, at least one link cost in the ring modified to prevent equal cost multi-path application to traffic.

17. The apparatus of claim 12 wherein updating the forwarding information base comprises updating an entry for a node adjacent to a failed link after updating other entries for said network topology change.

18. The apparatus of claim 12 configured for placement in a ring comprising an even number of nodes, wherein the processor is further operable to select a next hop for the test packet using a load balancing algorithm that masks or deprioritizes selected next hops through an input interface.

19. The apparatus of claim 12 wherein the processor is further operable to transmit another test packet if no packet is received in response to transmitting the test packet after a specified period of time.

20. Logic encoded on one or more non-transitory computer readable media for execution by a processor and when executed operable to:
identify a change in network topology;
transmit a test packet to determine if an adjacent network device located in a backup path has converged following said network topology change, wherein the test packet is sent to a node in the backup path downstream of the adjacent network device;
receive the test packet and determine if the adjacent network device has converted;
determine that the backup path has not yet converged;
resend the test packet after a specified time to check if the adjacent network device has converged; and
receive a response to the test packet indicating the adjacent network device has converged and update a forwarding information base in response to said network topology change, wherein the response indicates that nodes in the backup path have converged and it is safe to update the forwarding information base at the network device to transmit traffic on the backup path, wherein the nodes in the backup path have converged when the nodes have consistent forwarding information bases to prevent micro-loops;
wherein the adjacent network device has converged when its forwarding information base has been updated to account for the change in network topology.

* * * * *